US012394891B2

(12) United States Patent
Holzer

(10) Patent No.: US 12,394,891 B2
(45) Date of Patent: Aug. 19, 2025

(54) PHASE ARRAY ANTENNA SYSTEM AND PHASE ARRAY ANTENNA FOR IMPROVED TRANSMISSION AND RECEPTION ISOLATION

(71) Applicant: L3Harris Technologies, Inc., Melbourne, FL (US)

(72) Inventor: Kyle D. Holzer, Bountiful, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 187 days.

(21) Appl. No.: 18/367,707

(22) Filed: Sep. 13, 2023

(65) Prior Publication Data

US 2025/0087878 A1 Mar. 13, 2025

(51) Int. Cl.
*H01Q 1/52* (2006.01)
*H01Q 3/26* (2006.01)

(52) U.S. Cl.
CPC ........... *H01Q 1/525* (2013.01); *H01Q 3/2617* (2013.01)

(58) Field of Classification Search
CPC .......... H01Q 1/52; H01Q 1/521; H01Q 1/525; H01Q 3/26; H01Q 3/2605; H01Q 3/2611; H01Q 3/2617; H01Q 3/2623
See application file for complete search history.

(56) References Cited

U.S. PATENT DOCUMENTS

| | | | |
|---|---|---|---|
| 9,960,500 B2 | 5/2018 | Song et al. | |
| 2012/0289172 A1 | 11/2012 | Holter | |
| 2017/0012363 A1 | 1/2017 | Zou et al. | |
| 2017/0264014 A1* | 9/2017 | Le-Ngoc | H01Q 21/065 |
| 2018/0108985 A1 | 4/2018 | Wang et al. | |
| 2020/0028275 A1* | 1/2020 | Ahmadloo | H01Q 1/38 |

FOREIGN PATENT DOCUMENTS

| | | |
|---|---|---|
| CN | 104600428 A | 5/2015 |
| CN | 112701475 | 4/2021 |
| JP | 3876764 | 2/2007 |

* cited by examiner

*Primary Examiner* — Daniel Munoz
(74) *Attorney, Agent, or Firm* — Fox Rothschild LLP; Carol E. Thorstad-Forsyth

(57) ABSTRACT

A phase array antenna system includes a first panel comprising a first array of antennas in a first grid pattern for transmitting first signals, and a second panel comprising a second array of antennas in a second grid pattern for receiving second signals. The first panel and the second panel are fixedly disposed in a plane and co-located along a direction in in the plane. The first grid pattern is the same as the second grid pattern, and the first panel and the second panel are rotated by an angle.

20 Claims, 6 Drawing Sheets

PHASE ARRAY ANTENNA SYSTEM AND PHASE ARRAY ANTENNA FOR IMPROVED TRANSMISSION AND RECEPTION ISOLATION

BACKGROUND OF THE DISCLOSURE

1. Technical Field

The present disclosure relates to antenna systems and antenna arrays, and, in particular, to phase array antenna systems and phase antenna arrays for simultaneous transmitting and receiving signals with improved transmission and reception isolation.

2. Background and Relevant Art

Generally, antenna systems include transmitting antennas and receiving antennas. Based on the distance between the transmitting antennas and receiving antennas, electromagnetic fields or waves, which are transmitted by the transmitting antennas, can couple with the receiving antennas. Such coupling might be unintentional, cause signal distortion at the receiving antennas, reduce signal-to-noise ratio, and increase difficulties in extracting intended signals from the received signals.

It has been accepted in as general knowledge in the field of phased array antenna design that isolation between closely spaced transmit and receive phased array antennas is dominated by near-field electromagnetic signal propagation and not significantly affected by far-field antenna radiation patterns. Due to this widely accepted understanding, phased array antenna sidelobe patterns have not been used in the state-of-the-art designs to optimize for transmit to receive isolation performance.

To address required transmit to receive isolation in Frequency Division full Duplex (FDD) and Code Division Multiple Access (CDMA) systems, a space between the transmitting and receiving antennas are lengthened to prevent unintentional interference from the transmitting antenna. However, such lengthening necessitates more space in the antenna system and needs additional components (e.g., wirings and other electrical components) to accommodate the lengthened distance.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to phase array antenna systems and phase array antenna devices, which include a first array of phase specific antennas and a second array of phase specific antennas, and simultaneously transmit and receive signals with improved isolation at the same frequency or different frequencies. The distance between the first and second arrays of antennas is reduced based on a rotation of the first and second arrays of phase antennas. Thereby, sidelobes have deeper and larger nulls in a radiation pattern in the direction of signal propagation between the two antenna arrays than a configuration of the first and second arrays of antennas without a rotation. In other words, based on the rotation of the antenna arrays, same performance can be achieved with a distance, which is less than a distance between the transmitting and receiving antenna arrays without the rotation.

According to embodiments, a phase array antenna system includes a first panel comprising a first array of antennas in a first grid pattern for transmitting first signals, and a second panel comprising a second array of antennas in a second grid pattern for receiving second signals. The first panel and the second panel are fixedly disposed in a plane and co-located along a direction in the plane. The first grid pattern is the same as the second grid pattern, and the first panel and the second panel are rotated by an angle.

According to another embodiment, a phase antenna array includes a dielectric substrate including a plane surface, a first array of antennas disposed along a direction on the plane surface of the dielectric substrate in a first grid pattern for transmitting first signals, and a second array of antennas disposed along the direction on the plane surface of the dielectric substrate in a second grid pattern for receiving second signals. The first grid pattern is the same as the second grid pattern, and the first grid pattern and the second grid pattern are rotated by an angle with respect to the direction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein relate to phase antenna arrays and systems for improved transmission and reception isolation by rotating transmitting and receiving antennas. Further, based on the rotation, the radiation patterns of the phase antenna arrays and systems have deeper nulls in the sidelobes in the direction of signal propagation between the transmitting and receiving antenna arrays than phase antenna systems without the rotation. Furthermore, based on the rotation, the distance between the transmitting and receiving antennas can be less than the distance between the transmitting and receiving antennas without rotation, thereby reducing the total area of the phase antenna array.

Figure 1:
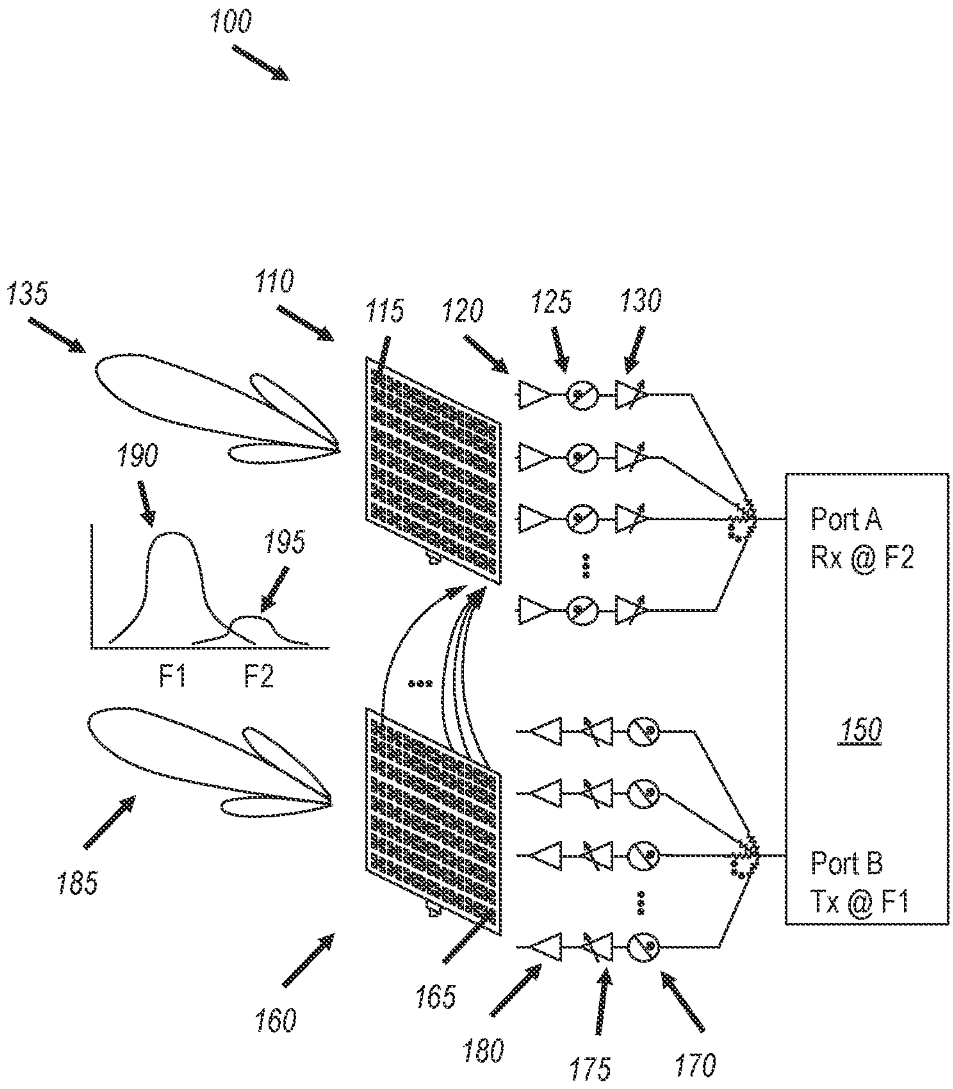
FIG. 1 illustrates a phase antenna system for transmitting and receiving signals according to embodiments of the present disclosure.

FIG. 1 shows a phase antenna system 100, which enables simultaneous two-way communication over the same frequency or different frequencies, according to embodiments of the present disclosure. The phase antenna system 100 includes a receiving antenna array 110, a control circuit 150, and a transmitting antenna array 160. The control circuit 150 controls phases of the transmitting signals and receiving signals so that the phase antenna system 100 is capable of directing a direction of the transmitting and receiving signals. Further, the control circuit 150 may process the receiving signals for communication with another phase antenna system. The receiving antenna array 110 includes a plurality of phase antennas 115, and the transmitting antenna array 160 includes a plurality of phase antennas 165.

To transmit signals in a particular direction, the phase antenna system 100 further includes a phase shifter 170, a low noise amplifier (LNA) 175 that may also include a variable amplitude adjustment, and an amplifier 180 for each phase antenna 165 of the transmitting antenna array 160. The control circuit 150 may control phases for each phase shifter 170 so that the transmitting antenna array 160 as a whole can direct the transmitting direction of the signals. The control circuit 150 may generate the signal at a first frequency F1.

The control circuit 150 may include a digital processor (e.g., a central processing unit (CPU), a graphical processing unit (GPU), a microprocessor, or application specific integrated circuit (ASIC), etc.) which performs digital operations by executing computer-executable instructions or programs. The control circuit 150 may also include a memory storing the computer-executable instructions or programs. In an aspect, the control circuit 150 may be analog circuitry designed to perform operations or processes.

The phase shifter 170 may be an electronic device configured to introduce a controlled phase shift to the signal. The phase shifter 170 may include a phase shift and/or time delay, which delays time through a transmission line or any other transmission medium.

The phase shifted signal is then amplified by the LNA 175. When amplified, the overall noise level in the signal is generally amplified. On the other hand, the LNA 175 preserves and amplifies the quality of the signal, and minimizes amplification of the noise part in the signal. This LNA 175 may also adjust the amplitude of the signal independently in each transmit path. Similar to the specific phase shifts needed on each path as described earlier to direct the transmitting direction of the signals, the specific amplitude adjustment on each path may be used to optimize radiation patterns and transmitting direction of the signals. Now, the amplifier 180 generally amplifies the signal from the LNA 175. The amplified signal then causes the antenna 165 to transmit an electromagnetic wave corresponding to the amplified signal with the phase information.

The transmitting antenna array 160 includes an array of phase antennas 165. In an aspect, the plurality of phase antennas 165 may include any type of radiation aperture, for example patch antenna, dipole antenna, horn antenna, Vivaldi antenna, open waveguide, or the likes. Since each phase antenna 165 receives signals with a corresponding phase, when the transmitting antenna array 160 transmits electromagnetic waves, the wave front is formed by the plurality of electromagnetic waves emitted by the plurality of phase antennas 165 and transmitted to a direction (e.g., a beam forming direction) specified by the wave front. In other words, the transmitting antenna array 160 may emit electromagnetic waves having directivity based on the phase information. The control circuit 150 may control the directivity of the electromagnetic waves based on consorted phase information for the plurality of phase antennas 165. The directivity may be up to 15°, 30°, 45°, 60°, or 750 around the azimuth direction with respect to the surface of the transmitting antenna array 160. The azimuth direction may be a direction perpendicular to the surface of the transmitting antenna array 160. By dynamically controlling the signal phase and amplitude for the plurality of phase antennas 165, the control circuit 150 may emit electromagnetic waves in any intended direction.

The transmitting radiation pattern 185 shows the directivity of the electromagnetic waves. The biggest lobe is the main lobe and the direction of the main lobe is the direction, to which the control circuit 150 intends to send the electromagnetic waves. As shown in the transmitting radiation pattern 185, there are sidelobes, whose amplitude is smaller than the amplitude of the main lobe and whose direction is different from the direction of the main lobe. These sidelobes may be unintended and caused to occur due to antenna design, aperture effects, design imperfections, and/or mutual coupling.

The magnitude of the electromagnetic waves is shown in a curve 190, which is centered at the first frequency F1. The electromagnetic waves are transmitted and typically received from a target communication system positioned in the signal propagation direction of the electromagnetic waves. The electromagnetic waves transmitted by the target communication system may be received by the receiving antenna array 110. The received electromagnetic waves also have a directivity as shown in the receiving radiation pattern 135. As in the transmitting radiation pattern 185, the receiving radiation pattern 135 also has sidelobes, whose direction is different from the direction of the main lobe and whose magnitude is smaller than the magnitude of the main lobe.

The magnitude of the electromagnetic waves, at the time of the reception by the receiving antenna array 110, is much smaller than the original magnitude of the electromagnetic waves transmitted by the target communication system. Typical Frequency Division full Duplex (FDD) communication systems will use a discrete frequency for the transmission curve 190 and a separate frequency for a reception curve 195. In traditional non-compact phased array antenna systems, high performance filters enable the transmitting and receiving signal chains to provide the required isolation between transmitting and receiving radiofrequency chains. These high performance Tx/Rx filters are typically located at the antenna aperture to maximize filter effectiveness. In the case of compact phased array antennas, there is not an area sufficient to locate a high performance filter for Tx/Rx isolation at each antenna aperture. The reception curve 195 shows that the received electromagnetic waves are centered at the second frequency F2 and the magnitude is smaller than the magnitude of the electromagnetic waves transmitted by the target communication system. In an aspect, transmitting and receiving signals may be located in the same portion of frequency spectrum and the first frequency F1 and the second frequency F2 may be same.

In the reception part, the phase antenna system 100 includes a low noise amplifier or LNA 120, a phase shifter 125, and a variable gain amplifier 130. When each phase antenna 115 of the receiving antenna array 110 receives the electromagnetic waves, the amplifier 120 amplifies the received electromagnetic waves and the phase shifter 125 shifts the amplified electromagnetic waves. In an aspect, the phase may be predetermined by the control circuit 150.

In another aspect, the phase shift amount of the phase antenna 165 may not be fixed. The control circuit 150 may dynamically adjust phase shifts of the phase antennas 115 to make beam forming in different directions to find a direction, which has the best signal-to-noise ratio.

The phase shifted signals are amplified by the adjustable gain amplifier or the LNA 130. As described for the LNA 175, the adjustable gain amplifier 130 adjusts amplitude to optimize receive antenna patterns similar to the transmit antenna amplitude adjustments and preserves and amplifies the quality of the signal, and minimizes amplification of the noise part in the signal. With the phase shifts, which are controlled by the control circuit 150, for all phase antennas 115, the control circuit 150 may be able to recover signals from the main lobe of the received electromagnetic waves. In this configuration, the phase antenna system 100 may be able to detect one or more objects positioned in the way of transmitting electromagnetic waves. Further, the phase antenna system 100 may be able to detect a position, a movement, or a speed of the objects based on the received electromagnetic waves.

In an aspect, the electromagnetic waves may be used for communication. In this regard, the electromagnetic waves transmitted by the transmitting antenna array 160 of the phase antenna system 100 may be received not by the receiving antenna array 110 but by a receiving antenna array of a target communication system. Likewise, the receiving antenna array 110 of the phase antenna system 100 may receive electromagnetic waves, which are transmitted by the target communication system.

Figure 2:
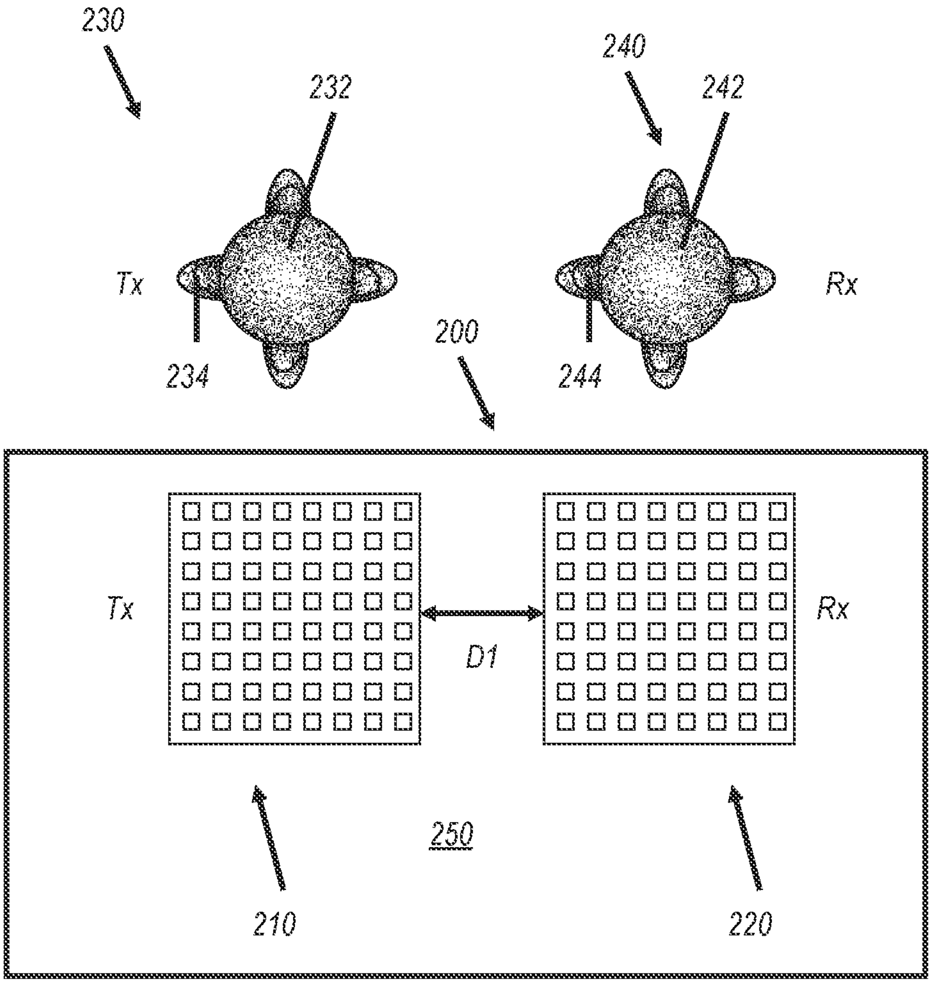
FIG. 2 illustrates a conventional antenna system.

As described above, isolation between the receiving antenna array and the transmitting antenna array is important to reduce interference caused when portions of the electromagnetic waves transmitted by the transmitting antenna array are directly received by the receiving antenna array. For example, FIG. 2 shows a conventional phase antenna array device 200, which has a dielectric substrate 250 having a plane surface. Other electrical components (e.g., LNAs, amplifiers, phase shifters, etc.) are omitted here. A transmitting antenna grid 210 and a receiving antenna grid 220 are fixedly disposed or installed on the plane surface of the dielectric substrate 250 with a distance D1 therebetween and are co-located along a direction in the plane. The space between the transmitting antenna grid 210 and the receiving antenna grid 220 may be formed with a material, which absorbs electromagnetic waves to reduce interference between the transmitting antenna grid 210 and the receiving antenna grid 220. The greater the distance D1 is, the lower the interference will be. However, when the distance D1 is large (e.g., 8 inches or greater), the dielectric substrate 250 needs more space in the conventional phase antenna array device 200, and the conventional phase antenna array device 200 requires more wirings to accommodate the distance D1.

Generally, the transmitting antenna grid 210 and the receiving antenna grid 220 are positioned within the dielectric substrate 250 along one direction. For example, the positions of the transmitting antenna grid 210 and the receiving antenna grid 220 are parallel with respect to the length or width direction.

The shape of the transmitting antenna grid 210 and the receiving antenna grid 220 may be rectangular, square, octagonal, or other symmetric configuration. On the transmitting antenna grid 210, an array of antenna elements are installed following an antenna grid pattern. Based on the antenna grid pattern characteristics and the shape of the transmitting antenna grid 210, the radiation pattern 230 may be formed by the transmitting antenna grid 210. The central portion in the radiation pattern 230 is the main lobe 232. Four sidelobes 234 are also shown in the radiation pattern 230 because of the shape of the transmitting antenna grid 210. There is a far field antenna pattern null in the radiation pattern 230. Each of the far field antenna pattern nulls points to the 45 degree direction with respect to the horizontal direction. Thus, no far field antenna pattern null points to the receiving antenna grid 220.

Likewise, the receiving antenna grid 220 has an array of antenna elements in a grid pattern. The shape of the receiving antenna grid 220 also has the same shape as the transmitting antenna grid 210. When the array of antennas of the receiving antenna grid 220 receive electromagnetic waves, the array of antennas of the receiving antenna grid 220 also has a radiation pattern 240, which is substantially similar to the radiation pattern 230 due to the same shape. The central portion in the radiation pattern 240 is the main lobe 242. Four sidelobes 244 are also shown in the radiation pattern 240 because of the shape of the receiving antenna grid 220. There is a far field antenna pattern null in the radiation pattern 240. Each of the far field antenna pattern nulls points to a 45 degree direction with respect to the horizontal direction. Thus, no far field antenna pattern null points to the transmitting antenna grid 210.

In an aspect, the grid pattern may be a triangle, square, diamond, or honeycomb pattern. That is the arrangement of each antenna element in the transmitting and receiving antenna grids 210 and 220 are in a triangle, square, diamond, or honeycomb pattern. The grid pattern of antennas may have the triangle, square, diamond, or honeycomb pattern forming a square-, rectangle-, diamond-, or honeycomb shape for the transmitting and receiving antenna grids 210 and 220.

In a case where the grid pattern is square, the number of antennas in the length direction may be equal to the number of antennas in the width direction. In another case where the grid pattern is rectangular shape, the number of antennas in the length direction may not be equal to the number of antennas in the width direction. In still another case where the grid pattern is triangle shape, the number of antennas in the length direction may be equal or unequal to the number of antennas in the width direction.

Figure 3A:
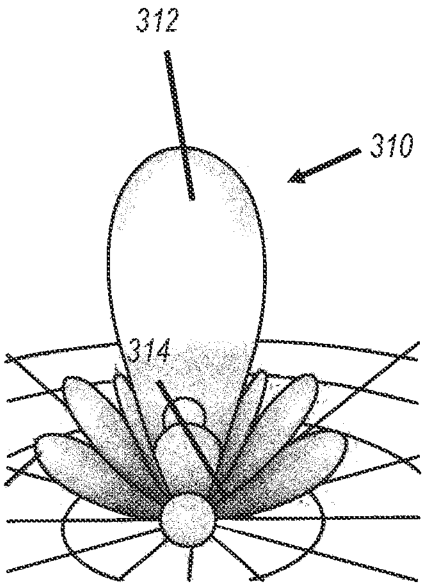
FIG. 3A illustrates a three-dimensional coupling radiation pattern of the conventional antenna of FIG. 2.
Figure 3B:
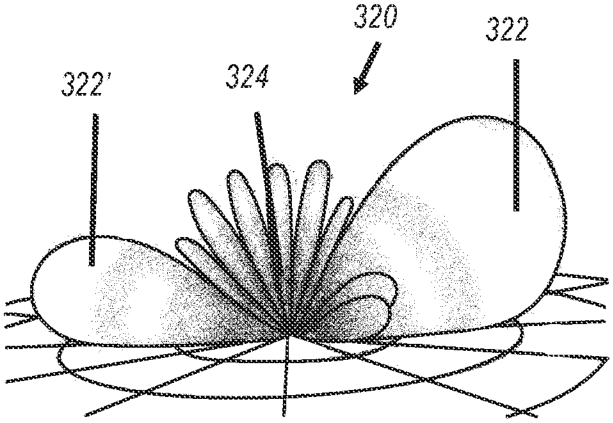
FIG. 3B illustrates a three-dimensional coupling radiation pattern of the conventional antenna of FIG. 2.

FIG. 3A illustrates a three-dimensional coupling radiation pattern 310 of the conventional phase antenna array device 200 when the transmitting antenna grid 210 emits electromagnetic waves at one frequency (e.g., 15 GHz) along the azimuth axis or Z-axis, and FIG. 3B illustrates a three-dimensional coupling radiation pattern 320 of the conventional phase antenna array device 200 when the transmitting antenna grid 210 emits electromagnetic waves at the frequency (e.g., 15 GHz) along a direction with 60° angle with the azimuth axis or Z-axis. The three-dimensional coupling radiation pattern 310 has sidelobes and nulls 314 between adjacent sidelobes and the main lobe 312.

On the other hand, the three-dimensional coupling radiation pattern 320 has another main lobe or back lobe 322' at the opposite direction than the main lobe 322 is formed. The magnitude of the back lobe 322' is smaller than the main lobe 322. Sidelobes are formed between the main lobe 322 and the back lobe 322'. Nulls 324 are also formed between adjacent sidelobes.

Figure 3C:
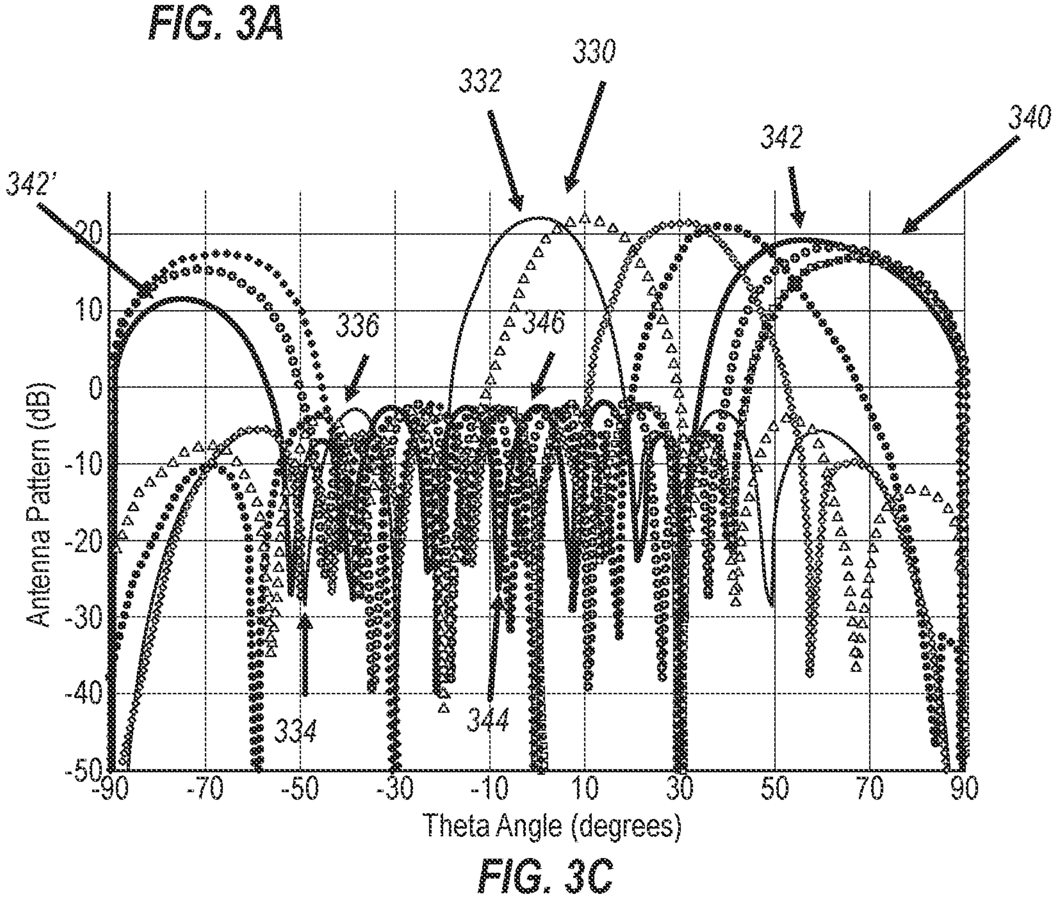
FIG. 3C illustrates two-dimensional coupling radiation patterns of the conventional antenna of FIG. 2.

FIG. 3C illustrates two-dimensional representations of coupling radiation patterns including the three-dimensional coupling radiation pattern 310 of FIG. 3A and the three-dimensional coupling radiation pattern 320 of FIG. 3B. The horizontal axis represents an angle theta, θ, which is an angle from the positive Z-axis in the spherical coordinate system, and the vertical axis shows the magnitude of lobes in decibel (dB) scale. Further, the two-dimensional representation is taken from the three-dimensional coupling radiation pattern with a phi angle, ϕ, being zero. The angle ϕ is an angle from the positive X-axis in the X-Y plane of the spherical coordinate system. In other words, the two-dimensional representations are in the X-Z plane and the horizontal axis represents the angle, θ, from the positive Z-axis. Thus, the two-dimensional coupling radiation pattern 330 is a cross-section view of the three-dimensional coupling radiation pattern 310 along the X-Z plane.

The two-dimensional coupling radiation pattern 330 has a main lobe 332 around θ=0°. The main lobe 332 has the biggest magnitude at θ=0°, about 20 dB. The magnitude of the main lobe 332 decreases as the angle θ increases to about 200 or decreases to about −20°. Thus, there is a null at about θ=20° or −20° between the main lobe 332 and the adjacent sidelobes. As shown in the three-dimensional coupling radiation pattern 310, there are three sidelobes from the main lobe 312 toward the X axis. Likewise, the two-dimensional coupling radiation pattern 330 also has three sidelobes to the positive or negative θ-axis or to θ=90° or θ=−90°. The middle sidelobe 336 has a magnitude of about −5 dB and one null 334 with the adjacent sidelobe. The magnitude of the null 334 is about −30 dB.

The two-dimensional coupling radiation pattern 340 has a main lobe 342 around θ=60°. The main lobe 342 has the biggest magnitude at θ=60°, close to 20 db. The magnitude of the main lobe 342 decreases as the angel θ increases to about 90° or decreases to about 30°. There is a null at about θ=30° between the main lobe 342 and the adjacent sidelobe. The magnitude of the sidelobes of the two-dimensional coupling radiation pattern 330 is about −10 dB.

As shown in FIG. 3B, the three-dimensional coupling radiation pattern 320 has another main lobe or back lobe 322'. Likewise, the two-dimensional coupling radiation pattern 340 also has the back lobe 342' centered at about θ=−70°. The overall size of the back lobe 342' is smaller in magnitude than that of the main lobe 342. Also as shown in FIG. 3B, there are six sidelobes between the main lobe 322 and the back lobe 322', there are six sidelobes between the main lobe 342 and the back lobe 342' in the two-dimensional coupling radiation pattern 340. Further, the null 344 between two adjacent sidelobes is close to −30 dB. The magnitude of the sidelobes of the two-dimensional coupling radiation pattern 340 is about −10 dB.

Based on the other two-dimensional patterns shown in FIG. 3C, in which the center of the main lobe is close to θ=60°, there is a back lobe 322' centered at a negative angle appears, meaning that a relatively huge amount of energy is lost in an unintended direction in transmitting and receiving electromagnetic waves. When the center of the main lobe is close to θ=0°, the back lobe 322' in the opposite side disappears and substantial portions of energy are distributed in the intended direction. Based on the inherent characteristics of phase array antenna systems, intended directions for beam forming are not always the azimuth direction but may range from θ=−30 to θ=30°. In aspects, the intended direction may range from θ=−45 to θ=45°, θ=−60 to θ=60°, θ=−75 to θ=75°, or θ=−90 to θ=90°. Thus, to have a better coverage, the range of θ may be greater than 30°, and, with the conventional design of the phase antenna array, substantial losses of energy in transmitting and receiving electromagnetic waves are unavoidable.

Figure 4:
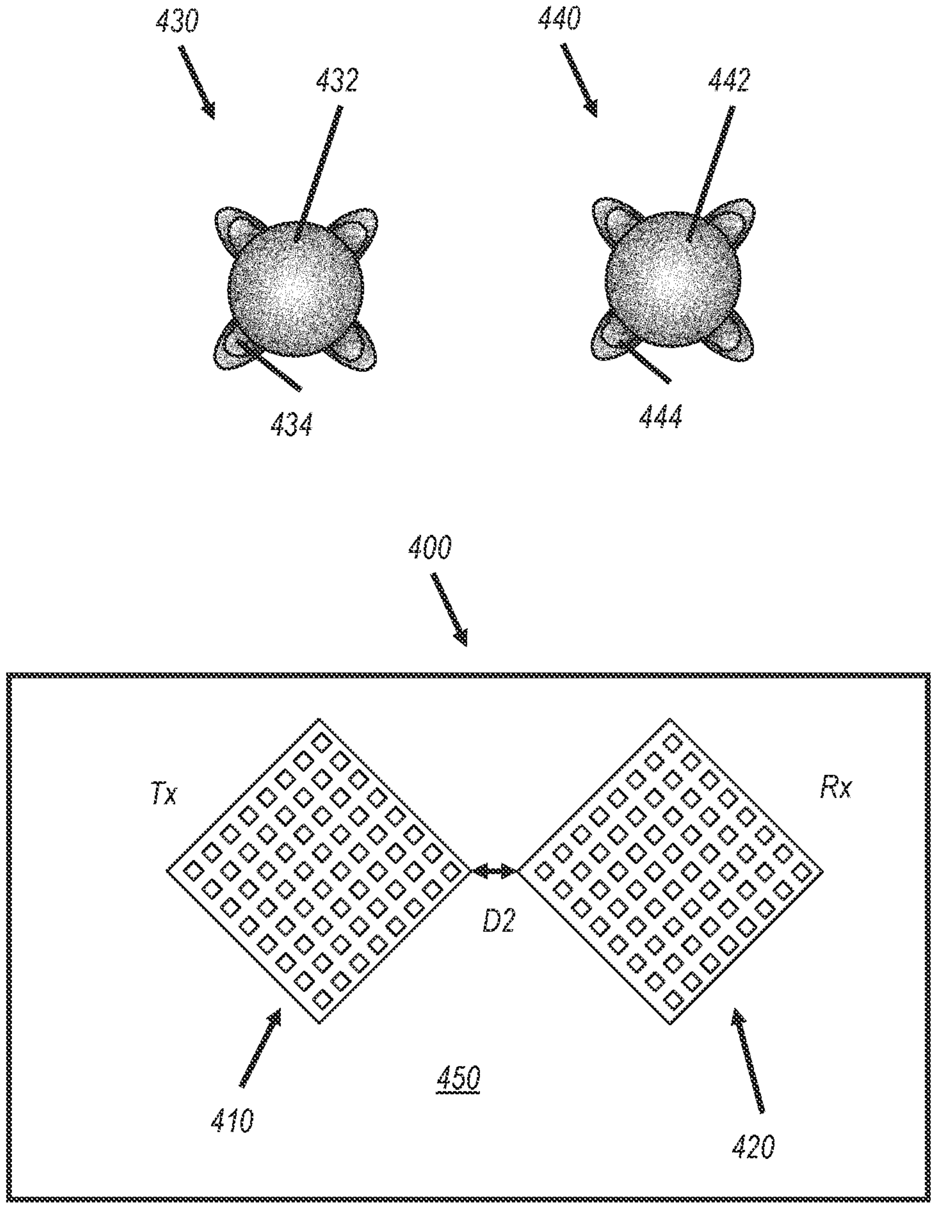
FIG. 4 illustrates a phase antenna array according to embodiments of the present disclosure.

To address this problem, FIG. 4 illustrates a phase antenna array device 400 according to embodiments of the present disclosure. The phase antenna array device 400 includes a dielectric substrate 450, which has a rectangular shape. The phase antenna array device 400 further includes a transmitting antenna grid 410 and a receiving antenna grid 420, which are affixed or installed on a plane surface of the dielectric substrate 450. The shapes of the transmitting antenna grid 410 and the receiving antenna grid 420 may be same. In an aspect, the shapes of the transmitting antenna grid 410 and the receiving antenna grid 420 are a square-, diamond-, rectangle-, or regular polygon-shape. In a preferred aspect, the shape may be a square shape.

The transmitting antenna grid 410 and the receiving antenna grid 420 may be positioned along a direction, which is parallel with the length or width direction. For example, the distance between the top edge of the phase antenna array device 400 and the transmitting antenna grid 410 is the same as the distance between the top edge of the phase antenna array device and the receiving antenna grid 420. In this configuration, the transmitting antenna grid 410 and the receiving antenna grid 420 are rotated around their respective centers. The rotation amount of the transmitting antenna grid 410 is equal to the rotation amount of the receiving antenna grid 420. In an aspect, the rotation amount may be 15°, 30°, 45°, 60°, 75°, or any angle between 15° and 75°.

In aspects, at least one of the vertices of the transmitting antenna grid 410 may directly point to the receiving antenna grid 420, and likewise, at least one of the vertices of the receiving antenna grid 420 may directly point to the transmitting antenna grid 410. For example, the right side vertex of the transmitting antenna grid 410 directly points to the receiving antenna grid 420, and the left side vertex of the receiving antenna grid 420 directly points to the transmitting antenna grid 410.

In aspects, an angle formed by the right vertex of the transmitting antenna grid 410 and the horizontal direction may be +30 or −30 degrees. The angle may be +15 or −15 degrees. Or the angle may be from −30 degrees to +30 degrees. Likewise, an angle formed by the left vertex of the receiving antenna grid 420 and the horizontal direction may be +30 or −30 degrees. The angle may be +15 or −15 degrees. Or the angle may be from −30 degrees to +30 degrees.

Now returning back to FIG. 2, two horizontal sidelobes of the radiation pattern 230 of FIG. 2 are parallelly aligned with two horizontal sidelobes of the radiation pattern 240. Likewise, two vertical sidelobes of the radiation pattern 230 are parallelly aligned with two vertical sidelobes of the radiation pattern 240. Now back to FIG. 4, four sidelobes 434 and 444 of each of the radiation patterns 430 and 440 of FIG. 4 are aligned in the X shape with respect to the horizontal direction, and the main lobes 432 and 442 are positioned in the centers of the radiation patterns 430 and 440. In a case when the amount of rotation is 45°, the top right sidelobe of the radiation pattern 430 is perpendicularly aligned with the top left sidelobe of the rotation pattern 440.

In an aspect, there is a far field antenna pattern null between two adjacent sidelobes 434 in the radiation pattern 430 in the radiation pattern 430. At least one of the far field antenna pattern nulls points to the 0 degree direction with respect to the horizontal direction. Thus, at least one far field antenna pattern null directly points to the receiving antenna grid 520. Likewise, there is a far field antenna pattern null between two adjacent sidelobes 444 in the radiation pattern 440. At least one of the far field antenna pattern nulls points to the 0 degree direction with respect to the horizontal direction. Thus, at least one far field antenna pattern null directly points to the transmitting antenna grid 410. Thereby, interference between the transmitting antenna grid 410 and the receiving antenna grid 420 is minimized and the transmission and reception isolation can be enhanced.

Due to the rotation, the distance D2 between the transmitting antenna grid 410 and the receiving antenna grid 420 is reduced from the distance D1 of FIG. 2. For example, in a configuration that the transmitting and receiving antenna grids 410 and 420 have the same dimension as the transmitting and receiving antenna grids 210 and 220 of FIG. 2, all antenna grids 210, 220, 410, and 420 have a square shape with 2 inches on each side, the centers of the transmitting antenna grids 210 and 410 correspond to each other, the centers of the receiving antenna grids 210 and 410 correspond to each other, and the distance D1 of FIG. 2 therebetween is 6 inches without the rotation, the distance D2 between the rotated antenna grids 410 and 420 is reduced by about 0.83 inches from 6 inches of the distance D1. Specifically, the distance between the centers of the transmitting and receiving antenna grids is 8 inches in both FIGS. 2 and 4, and the distance D2 can be calculated by $8-2\sqrt{2}$. Thus, the distance D2 between the rotated antenna grids 410 and 420 is about 5.17 inches, which are reduced by 0.83 inches from the distance D1. Even though the distance between the leftist vertex of the transmitting antenna grid 410 and the rightest vertex of the receiving antenna grid 420 is about 10.83 includes, which are greater than the distance of 10 inches between the left side of the transmitting antenna grid 210 and the right side of the receiving antenna grid 220, the rotational configuration of the transmitting antenna grid 410 and the receiving antenna grid 420 has much better isolation between transmission and reception than the configuration of FIG. 2. Benefits in isolation between transmission and reception are described below with reference to FIGS. 3C and 5.

In an aspect, the phase antenna array device 400 may simultaneously transmit and receive signals at one frequency or at different frequencies. Thus, without utilizing time division technique, the phase antenna array device 400 can perform a full duplex operation.

Figure 5:
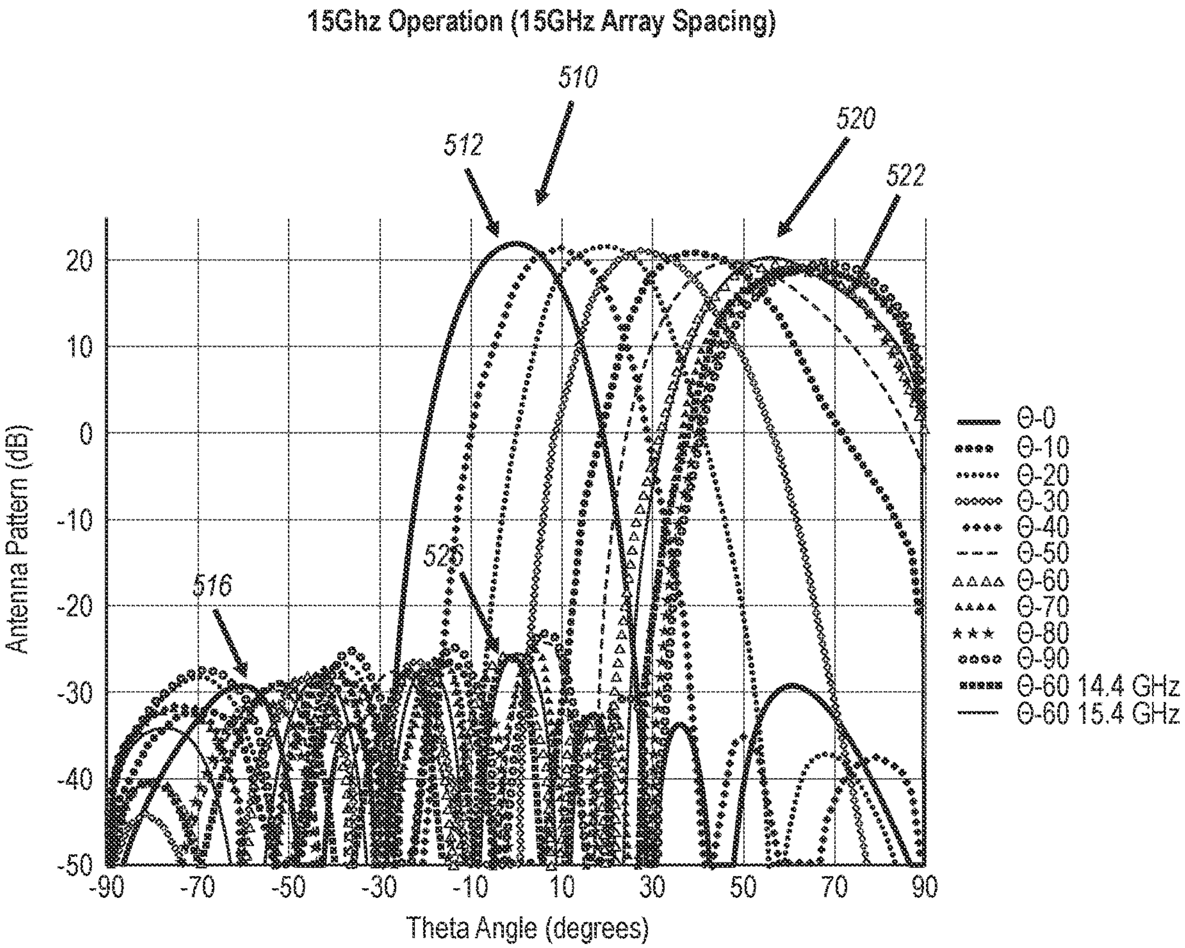
FIG. 5 illustrates antenna radiation patterns of the antenna array of FIG. 4 according to embodiments of the present disclosure.

FIG. 5 illustrates this isolation between transmission and reception. FIG. 5 illustrates two-dimensional representations of coupling radiation patterns 510 and 520 at a frequency (e.g., 15 GHz). The horizontal axis represents an angle theta, θ, which is an angle from the positive Z-axis in the spherical coordinate system, and the vertical axis shows the magnitude of lobes in decibel (dB) scale. The coupling radiation pattern 510 may be obtained when the transmitting antenna grid 410 emits electromagnetic waves at θ=0°, and the coupling radiation pattern 520 may be obtained when the transmitting antenna grid 410 emits electromagnetic waves at θ=60°.

The two-dimensional coupling radiation pattern 510 has a main lobe 532 around θ=0°, which corresponds to the main lobe of the electromagnetic waves transmitted by the transmitting antenna grid 410. The main lobe 512 has the biggest magnitude at θ=0°, about 20 dB. Compared to the main lobe 332 of the coupling radiation pattern 330, the biggest magnitude of the main lobe 512 is similar to the biggest magnitude of the main lobe 332. The magnitude of the main lobe 512 decreases as the angle θ increases to about 30° or decreases to about −30°. Thus, there is a null at about θ=30° or −30° between the main lobe 512 and the adjacent sidelobes. The magnitudes of the sidelobes are about −30 dB and −35 dB. There are two sidelobes from the main lobe 512 toward the positive or negative θ-direction, while the there are three sidelobes in the radiation pattern 330. The reduced number of sidelobes enable deeper and larger nulls so that transmission and reception isolation increases.

The two-dimensional coupling radiation pattern 520 has a main lobe 522 and five sidelobes to the negative θ-axis or to θ=−90°. The main lobe 522 has the biggest magnitude at θ=60°, about 20 dB. Compared to the main lobe 332 of the coupling radiation pattern 330, the biggest magnitude of the main lobe 512 is similar to the biggest magnitude of the main lobe 342. The middle sidelobe 336 has a magnitude of about −5 dB and one null 334 with the adjacent sidelobe. The magnitude of the null 334 is about −30 dB. Further, the nulls are less than −50 dB. Thus, compared to the coupling radiation pattern 330, the magnitudes of the sidelobes and the magnitude of nulls of the coupling radiation pattern 520 are at least 20 dB less than those of the coupling radiation pattern 330.

The two-dimensional coupling radiation pattern 520 has a main lobe 522 around θ=60°. The main lobe 522 has the biggest magnitude at θ=60°, close to 20 db. Compared to the main lobe 342 of the coupling radiation pattern 340, the biggest magnitude of the main lobe 512 is similar to the biggest magnitude of the main lobe 342. Four sidelobes have a magnitude of about −30 dB and the smallest sidelobe of the coupling radiation pattern 520 has a magnitude of about −40 dB. Nulls have magnitudes less than −50 dB. Thus, compared to the coupling radiation pattern 340, the magnitudes of the sidelobes and the magnitude of nulls of the coupling radiation pattern 520 are at least 20 dB less than those of the coupling radiation pattern 340. Further, compared to the back lobe 342' of the coupling radiation pattern 340, the coupling radiation pattern 520 does not have a back lobe.

As a result, by rotating the transmitting and receiving antenna grids, the magnitude of sidelobes and the magnitude of nulls have been reduced significantly. Further, the number of sidelobes has also reduced from 3 to 2 for the electromagnetic waves or beam forming at an angle θ=0° from the azimuth axis, and from 6 to 5 for the electromagnetic waves or beam forming at an angle θ=60° from the azimuth axis.

The reduction of magnitude of sidelobes and nulls are greater than 20 dB due to the rotation, and thus the transmission/reception isolation can be further increased. Since free space loss increases 6 dB for every doubling of radiating distance, a 20 dB reduction in nulls and sidelobes can reduce the distance D2 by at least 8 times. For example, if the distance D1 is 8 inches between the transmitting antenna grid 210 and the receiving antenna grid 220 of FIG. 2, by rotating the transmitting antenna grid 210 and the receiving antenna grid 220 so as to be the transmitting antenna grid 410 and the receiving antenna grid 420, the distance D2 between the transmitting antenna grid 410 and the receiving antenna grid 420 of FIG. 4 can be 1 inch to provide similar magnitudes as the coupling radiation patterns 330 and 340 of FIG. 3C. Thus, by reducing the distance D2 from the distance D1, the real estate of the dielectric substrate 450 can also be reduced. Thereby, the total volume or area of the phase antenna system can be correspondingly reduced so that the phase antenna system can be installed at many places with space flexibility.

In an aspect, the shape of the dielectric substrate 450 may not be a rectangle shape but may be any shape encompassing the transmitting antenna grid 410 and the receiving antenna grid 420. For example, the shape of the dielectric substrate 450 may be a combination of two connected diamond shapes, each of which can encompass one of the transmitting antenna grid 410 and the receiving antenna grid 420.

The grid pattern of the transmitting antenna grid 410 and the receiving antenna grid 420 may have the triangle, square, diamond, or honeycomb pattern forming the shape for the transmitting and receiving antenna grids 210 and 220 or the shape of the dielectric substrate 450.

In a case where the grid pattern is square, the number of antennas in the length direction may be equal to the number of antennas in the width direction. In another case where the grid pattern is rectangular shape, the number of antennas in the length direction may not be equal to the number of antennas in the width direction. In still another case where the grid pattern is triangle or honeycomb shape, the number of antennas in the length direction may be equal or unequal to the number of antennas in the width direction.

Figure 6A:
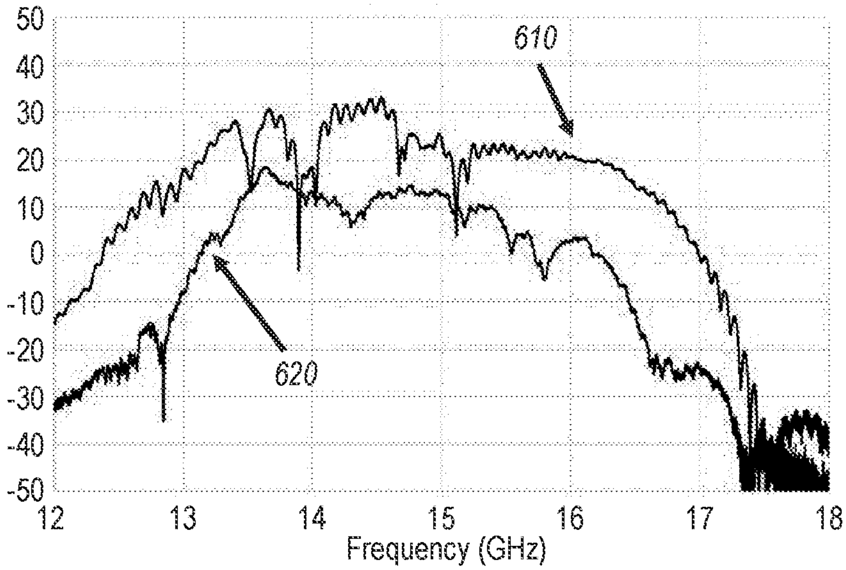
FIG. 6A illustrates radar transmission loss comparison between the conventional antenna system of FIG. 2 and the phase antenna array of FIG. 4 across frequencies according to embodiments of present disclosure.
Figure 6B:
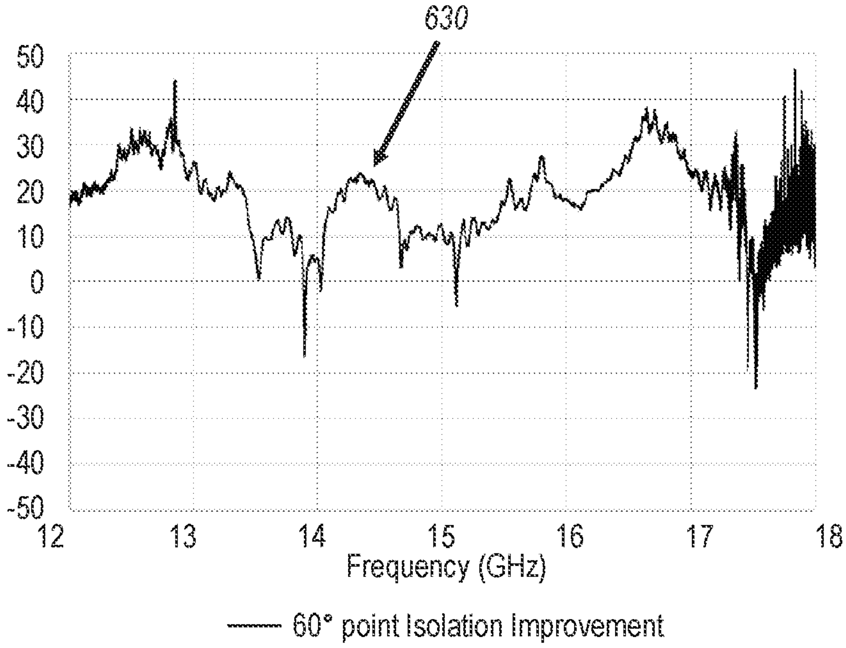
FIG. 6B illustrates improvement of radar transmission losses of the phase antenna array of FIG. 4 from the conventional antenna system of FIG. 2 according to embodiments of present disclosure.

FIG. 6A illustrates comparison between radar transmission losses between the conventional antenna system of FIG. 2 and the phase antenna array of FIG. 4 across frequencies according to embodiments of the present disclosure, and FIG. 6B illustrates improvement of radar transmission losses of the phase antenna array of FIG. 4 from the antenna system of FIG. 2. An energy loss plot 610 includes measurements of magnitude of electromagnetic waves with the conventional phase antenna array device 200 of FIG. 2, and an energy loss plot includes measurements of magnitude of electromagnetic waves with the phase antenna array device 400 of FIG. 4 across frequencies ranging from 12 GHz to 18 GHz. In this regard, the horizontal axis represents frequencies and the vertical axis represents energy losses in dB scale.

Since directivity of 0° from the azimuth axis clearly shows the differences in measurements between the conventional antenna system of FIG. 2 and the phase antenna array of FIG. 4 while directivity of 60° causes many (e.g., 5) sidelobes and potentially one back lobe, which can be the source of energy losses, directivity of the electromagnetic waves of 60° is used for the measurements in FIGS. 6A and 6B. Further, the distance D1 for the conventional phase antenna array device 200 of FIG. 2 is set to 6 inches, and the distance D2 of the phase antenna array device 400 is set to 3.5 inches.

Even though the distance D2 is shorter than the distance D1, the energy loss is improved by the phase antenna array device 400 of FIG. 4. Data plot 630 is obtained by subtracting energy loss plot 620 from the energy loss plot 610. As such, based on the data plot 630, energy loss is improved by the phase antenna array device 400 of FIG. 4 by about 10 dB through the frequencies. In good portions of the frequency range, at least 20 dB is the improvement in energy losses. In other words, the distance D2 can be further reduced to achieve the same energy losses as the conventional phase antenna array device 200.

Example Implementations

In view of the foregoing, the present invention relates, for example and without being limited thereto, to the following aspects:

In a first aspect, a phase array antenna system includes a first panel comprising a first array of antennas in a first grid pattern for transmitting first signals, and a second panel comprising a second array of antennas in a second grid pattern for receiving second signals. The first panel and the second panel are fixedly disposed in a plane and co-located along a direction in the plane. The first grid pattern is the same as the second grid pattern, and the first panel and the second panel are rotated by an angle.

In a second aspect of the phase array antenna system as recited in any of the preceding aspects, the angle is between 15 degrees and −15 degrees with respect to the direction.

In a third aspect of the phase array antenna system in any of the preceding aspects, the angle is between 30 degrees and −30 degrees.

In a fourth aspect of the phase array antenna system in any of the preceding aspects, the angle is 45 degrees.

In a fifth aspect of the phase array antenna system in any of the preceding aspects, at least one vertex of both of the first panel and the second panel directly points towards each other with +/−30 degrees.

In a sixth aspect of the phase array antenna system in any of the preceding aspects, each of the first and second antennas comprises patch antenna, dipole antenna, horn antenna, Vivaldi antenna, or open waveguide.

In a seventh aspect of the phase array antenna system in any of the preceding aspects, each of the first and second grid patterns is a square pattern forming a square-shaped panel for the first and second panels, and a number antennas in a width direction is equal to a number of antennas in a length direction in the square-shaped panel.

In an eight aspect of the phase array antenna system in any of the preceding aspects, each of the first and second grid patterns is a square pattern forming a rectangular-shaped panel for the first and second panels, and a number antennas in a width direction is not equal to a number of antennas in a length direction in the rectangular-shaped panel.

In a ninth aspect of the phase array antenna system in any of the preceding aspects, each of the first and second grid patterns is a triangle or honeycomb pattern forming a rectangular-, square-, other polygon-shaped panel for the first and second panels, and a number antennas in a width direction is equal to or not equal to a number of antennas in a length direction in the rectangular-, square-, other polygon-shaped panel.

In a tenth aspect of the phase array antenna system in any of the preceding aspects, the antenna system simultaneously performs transmitting the first signals and receiving the second signals at a same frequency or different frequencies.

In an eleventh aspect of the phase array antenna system in any of the preceding aspects, a distance between the first panel and the second panel is at least three times closer than a distance between the first panel and the second panel with a rotation to achieve same nulls in a radiation pattern.

In a twelfth aspect of the phase array antenna system in any of the preceding aspects, a far-field antenna pattern null in a radiation pattern of the first panel points towards the second panel and/or a far-field antenna pattern null in a radiation pattern of the second panel points towards to the first panel.

In a thirteenth aspect a phase antenna array includes a dielectric substrate including a plane surface, a first array of antennas disposed along a direction on the plane surface of the dielectric substrate in a first grid pattern for transmitting first signals, and a second array of antennas disposed along the direction on the plane surface of the dielectric substrate in a second grid pattern for receiving second signals. The first grid pattern is the same as the second grid pattern, and the first grid pattern and the second grid pattern are rotated by an angle with respect to the direction.

In a fourteenth aspect of the phase antenna array in any of the preceding aspects from the thirteenth aspect, the angle is between 15 degrees and −15 degrees with respect to the direction.

In a fifteenth aspect of the phase antenna array in any of the preceding aspects from the thirteenth aspect, the angle is 45 degrees.

In a sixteenth aspect of the phase antenna array in any of the preceding aspects from the thirteenth aspect, each of the first and second grid patterns is a square pattern forming a square-shaped panel for the first and second panels, and a number antennas in a width direction is equal to a number of antennas in a length direction in the square-shaped panel.

In a seventeenth aspect of the phase antenna array in any of the preceding aspects from the thirteenth aspect, each of the first and second grid patterns is a square pattern forming a rectangular-shaped panel for the first and second panels, and a number antennas in a width direction is not equal to a number of antennas in a length direction in the rectangular-shaped panel.

In an eighteenth aspect of the phase antenna array in any of the preceding aspects from the thirteenth aspect, each of the first and second grid patterns is a triangle or honeycomb pattern forming a rectangular-, square-, other polygon-shaped panel for the first and second panels, and a number antennas in a width direction is equal to or not equal to a number of antennas in a length direction in the rectangular-, square-, other polygon-shaped panel.

In a nineteenth aspect of the phase antenna array in any of the preceding aspects from the thirteenth aspect, a distance between the first grid pattern and the second grid pattern is at least three times closer than a distance between the first grid pattern and the second grid pattern without a rotation to achieve same nulls in all azimuth radiation.

In a twentieth aspect of the phase antenna array in any of the preceding aspects from the thirteenth aspect, a far-field antenna pattern null in a radiation pattern of the first array points towards the second array, and/or a far-field antenna pattern null in a radiation pattern of the second array towards to the first array.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the FIGS.

Any of the herein described methods, programs, algorithms or codes may be converted to or expressed in one or more programming languages or computer programs. The terms "programming language" and "computer program," as used herein, each include any language used to specify instructions to a computer, and include (but is not limited to) the following languages and their derivatives: Assembler, Basic, Batch files, BCPL, C, C+, C++, C#, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A phase array antenna system, comprising:

a first panel comprising a first array of antennas in a first grid pattern for transmitting first signals, wherein the first panel comprises a first edge having a first vertex at an end and a second vertex at an opposing end; and a second panel comprising a second array of antennas in a second grid pattern for receiving second signals, wherein the second panel comprises a second edge having a third vertex at an end and a fourth vertex at an opposing end, and the third vertex being located closer to the first vertex as compared to the second vertex;

wherein the first panel and the second panel are fixedly disposed in a plane and co-located along a direction in the plane;

wherein the first grid pattern is the same as the second grid pattern; and wherein the first panel and the second panel are rotated by an angle such that (i) the first edge of the first panel is adjacent to and nonparallel with the second edge of the second panel and (ii) a distance between the first vertex of the first panel and the third vertex of the second panel is different than a distance between the second vertex of the first panel and the fourth vertex of the second panel.

2. The phase array antenna system according to claim 1, wherein the angle is between 15 degrees and −15 degrees with respect to the direction.

3. The phase array antenna system according to claim 1, wherein the angle is between 30 degrees and −30 degrees.

4. The phase array antenna system according to claim 1, wherein the angle is 45 degrees.

5. The phase array antenna system according to claim 1, wherein the first vertex of the first panel directly points towards the third vertex of the second panel.

6. The phase array antenna system according to claim 1, wherein each of the first and second antennas comprises patch antenna, dipole antenna, horn antenna, Vivaldi antenna, or open waveguide.

7. The phase array antenna system according to claim 1, wherein each of the first and second grid patterns is a square pattern forming a square-shaped panel for the first and second panels, and a number antennas in a width direction is equal to a number of antennas in a length direction in the square-shaped panel.

8. The phase array antenna system according to claim 1, wherein each of the first and second grid patterns is a rectangular pattern forming a rectangular-shaped panel for the first and second panels, and a number antennas in a width direction is not equal to a number of antennas in a length direction in the rectangular-shaped panel.

9. The phase array antenna system according to claim 1, wherein each of the first and second grid patterns is a triangle or honeycomb pattern forming a rectangular-, square-, other polygon-shaped panel for the first and second panels, and a number antennas in a width direction is equal to or not equal to a number of antennas in a length direction in the rectangular-, square-, other polygon-shaped panel.

10. The phase array antenna system according to claim 1, wherein the antenna system simultaneously performs transmitting the first signals and receiving the second signals at a same frequency or different frequencies.

11. The phase array antenna system according to claim 1, wherein a distance between the first panel and the second panel is at least three times closer than a distance between the first panel and the second panel with a rotation to achieve same nulls in a radiation pattern.

12. The phase array antenna system according to claim 1, wherein a far-field antenna pattern null in a radiation pattern of the first panel points towards the second panel and/or a far-field antenna pattern null in a radiation pattern of the second panel points towards to the first panel.

13. A phase antenna array, comprising:

a dielectric substrate including a plane surface;

a first array of antennas disposed along a direction on the plane surface of the dielectric substrate in a first grid pattern for transmitting first signals, the antennas of the first grid pattern being arranged in a plurality of rows and a plurality of columns to collectively define a first two-dimensional shape with first edges extending between respective ones of a plurality of first vertices; and a second array of antennas disposed along the direction on the plane surface of the dielectric substrate in a second grid pattern for receiving second signals, the antennas of the second grid pattern being arranged in a plurality of rows and a plurality of columns to collectively define a second two-dimensional shape with second edges extending between respective one of a plurality of second vertices;

wherein the first grid pattern is the same as the second grid pattern; and wherein the first two-dimensional shape of the first grid pattern and the second two-dimensional shape of the second grid pattern are rotated by an angle with respect to the direction such that (i) one of the first edges is adjacent to and nonparallel with one of the second edges and (ii) a distance between a first vertex of the one of the first edges and a closest vertex of the one of the second edges is different than a distance between a second vertex of the one of the first edges and a farthest vertex of the one of the second edges.

14. The phase antenna array according to claim 13, wherein the angle is between 15 degrees and −15 degrees with respect to the direction.

15. The phase antenna array according to claim 13, wherein the angle is 45 degrees.

16. The phase antenna array according to claim 13, wherein each of the first and second grid patterns is a square pattern forming a square-shaped panel for the first and second panels, and a number antennas in a width direction is equal to a number of antennas in a length direction in the square-shaped panel.

17. The phase antenna array according to claim 13, wherein each of the first and second grid patterns is a rectangular pattern forming a rectangular-shaped panel for the first and second panels, and a number antennas in a width direction is not equal to a number of antennas in a length direction in the rectangular-shaped panel.

18. The phase antenna array according to claim 13, wherein each of the first and second grid patterns is a triangle or honeycomb pattern forming a rectangular-, square-, other polygon-shaped panel for the first and second panels, and a number antennas in a width direction is equal to or not equal to a number of antennas in a length direction in the rectangular-, square-, other polygon-shaped panel.

19. The phase antenna array according to claim 13, wherein a distance between the first grid pattern and the second grid pattern is at least three times closer than a distance between the first grid pattern and the second grid pattern without a rotation to achieve same nulls in all azimuth radiation.

20. The phase antenna array according to claim 13, wherein a far-field antenna pattern null in a radiation pattern of the first array points towards the second array, and/or a far-field antenna pattern null in a radiation pattern of the second array towards to the first array.

* * * * *